Patented Jan. 18, 1944

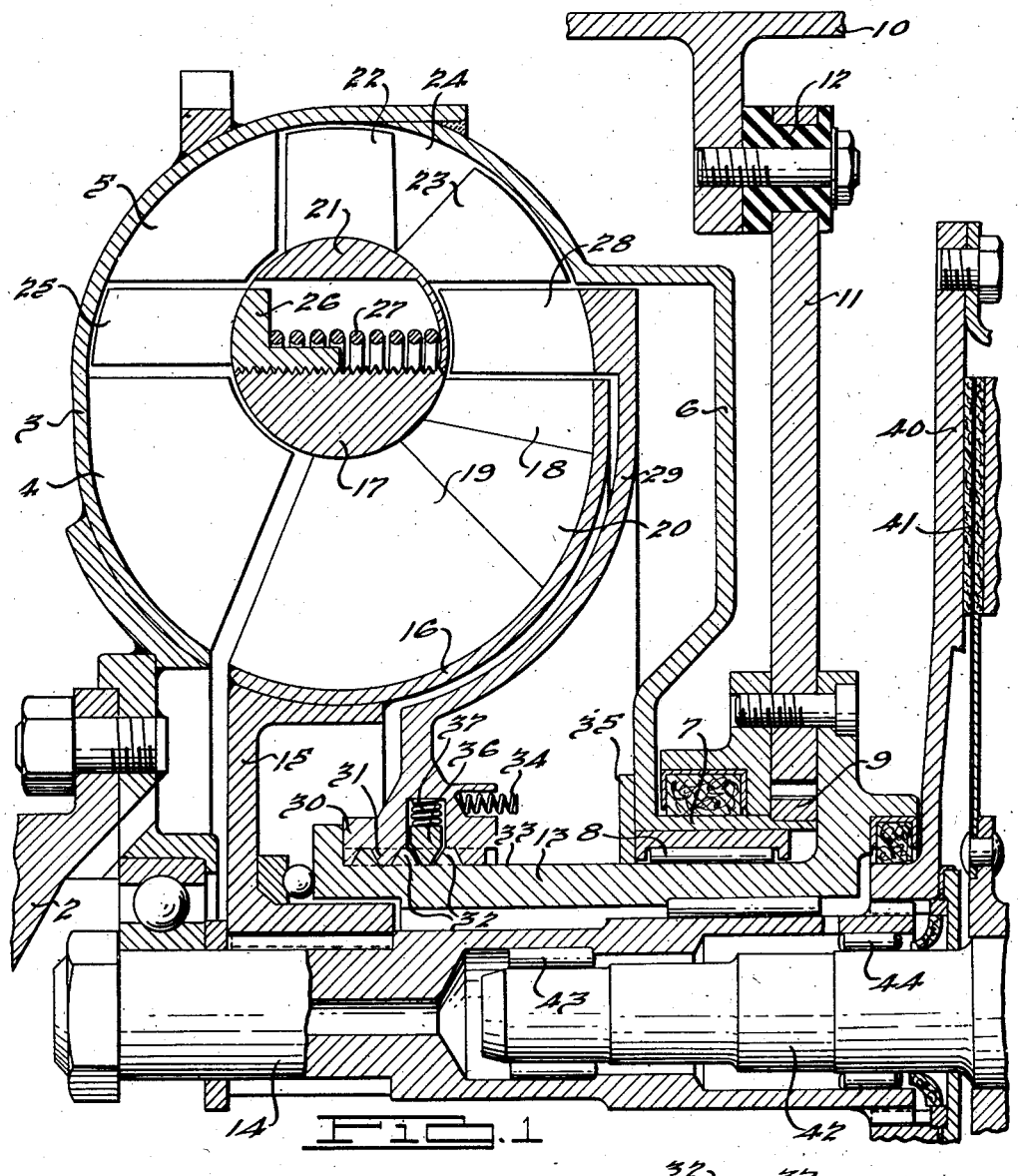
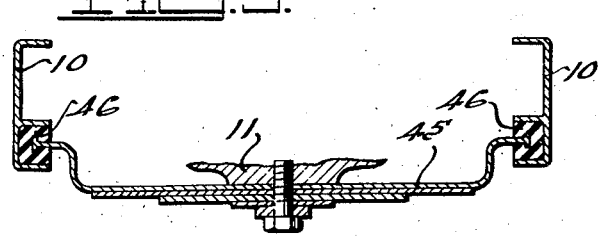
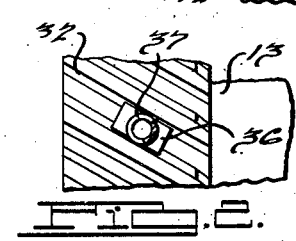

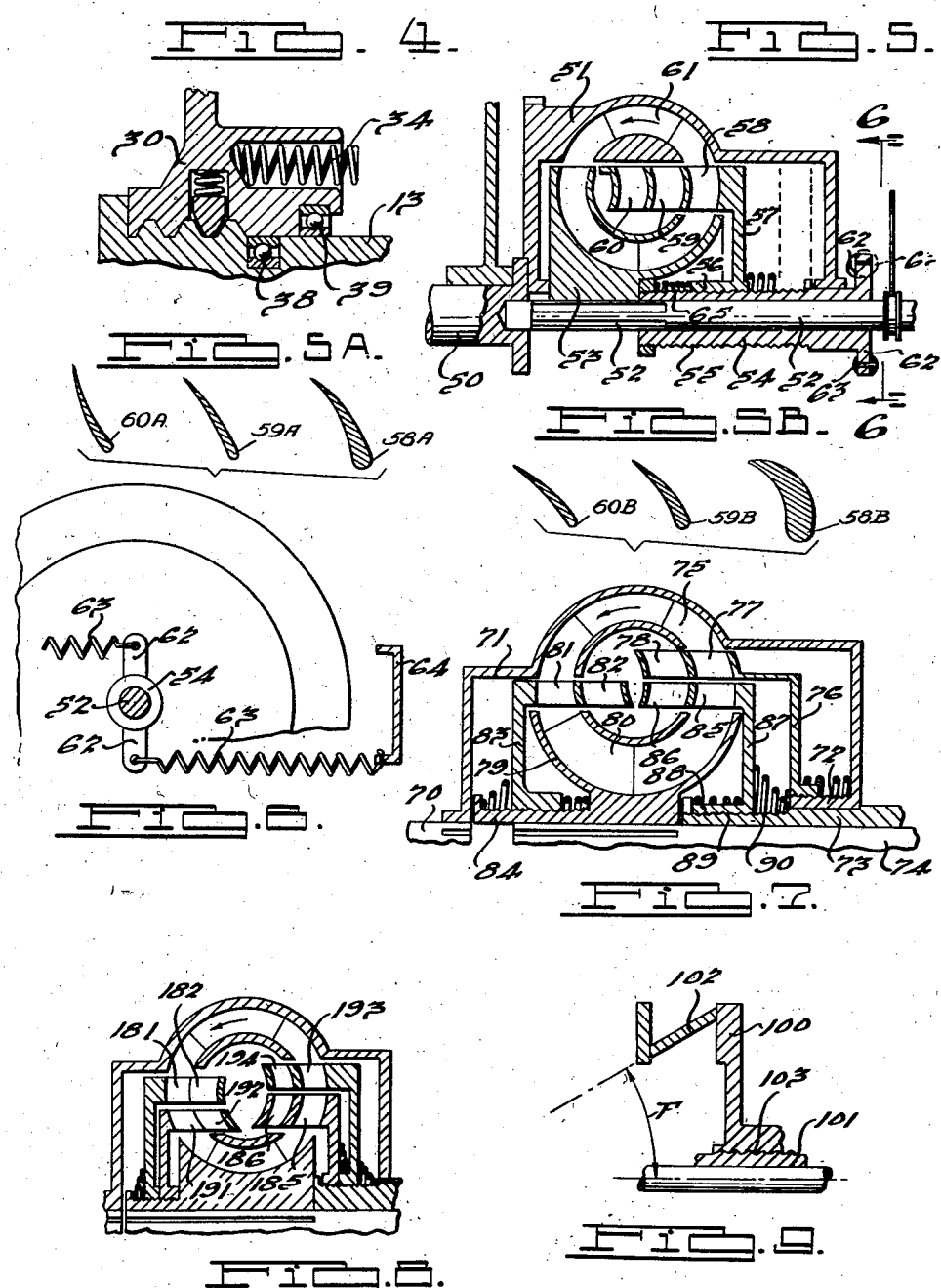

2,339,484

UNITED STATES PATENT OFFICE 2,339,484

TURBO TRANSMISSION

Joseph Jandasek, Detroit, Mich., assignor to Bendix Aviation Corporation, South Bend, Ind., a corporation of Delaware Application November 4, 1940, Serial No. 364,116

13 Claims. (Cl. 60—54)

This invention relates to transmissions and more particularly to turbo transmissions which may be selectively operated as torque converters or as turbo clutches.

An object of the invention resides in the provision of an axially shiftable blade wheel member operable under the influence of fluid reaction.

Another object of the invention resides in the making of blades in spaced sections wherein the first group may be formed of closely spaced contoured rectifying blades and the second group may be formed of more widely spaced relatively thin cross section blades.

A further object of the invention resides in the provision of angularly disposed friction means associated with an axially extending helix member to direct an axially movable member in opposite directions depending on the direction of rotation of said member to selectively operate the device as a torque converter or as a turbo clutch.

Yet a still further object is to provide anti-friction means to support an axially shiftable member.

A further object of the invention resides in the positioning of blades at an angle to the longitudinal axis of a turbo unit to create a side thrust to influence axial shifting of a movable member.

A further object of the invention resides in the provision of a resiliently mounted guide wheel member.

Another object is to provide spaced bearing members to maintain alignment between concentrically mounted members resiliently mounted in the frame of a motor vehicle.

Another object of the invention resides in the provision of a plurality of independently operable reaction members to selectively transform a turbo unit from a torque converter to a turbo clutch dependent on the speed of operation and the load to which the unit is subjected.

A still further object is to provide a plurality of axially movable reaction members which may independently move into and out of a fluid circuit to vary the torque multiplication transmitted by the device.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a longitudinal sectional view of a transmission device embodying the present invention.

Fig. 2 is a plan view of a stationary sleeve having a resiliently mounted block positioned thereon.

Fig. 3 is a sectional view illustrating a modified form of the invention.

Fig. 4 is a sectional view showing a modified form of a portion of the device illustrated in Fig. 1.

Fig. 5 is a longitudinal sectional view of a device embodying a modified form of the invention.

Figs. 5A and 5B are sectional views illustrating modified forms of guide wheel vanes adapted to be selectively introduced into the power transmitting fluid circuit.

Fig. 6 is an end elevation of the embodiment illustrated in Fig. 5 taken substantially on the line 6—6 of Fig. 5 looking in the direction of the arrows.

Fig. 7 is a longitudinal sectional view of a device embodying a further modified form of the invention.

Fig. 8 is a view similar to Fig. 7 showing another modified form of the invention.

Fig. 9 is a longitudinal sectional view illustrating an axially shiftable member having blades positioned at an angle to the longitudinal axis of the device adapted for use in any of the embodiments of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation.

Referring now to the embodiment of the invention illustrated in Fig. 1, it will be observed that a driving shaft 2 is operably connected to an impeller housing 3. The impeller housing 3 is provided with first and second stage impeller vanes 4 and 5 respectively and terminates in a radially extending flange 6 having an axially disposed portion 7 mounted on suitable bearing means 8. The axially disposed portion 7 is provided with a gear 9 which cooperates with a suitable pinion to form a fluid pump.

A stationary frame or bell housing 10 may be employed as a support or anchor for the turbo unit. A radially extending flange or spider member 11 may be suitably connected to the frame 10 by means of suitable resilient bushings 12. The flange or spider 11 may be provided with an axially extending sleeve 13 preferably concentrically mounted relative to the driving shaft 2 and surrounding a driven shaft 14.

The driven shaft 14 is provided with a radially extending web 15 which terminates in a turbine web 16. An inner turbine shroud 17 is suitably attached to the turbine web 16 by means of rectifying vanes 18 and main vanes 19. The vanes 18 and 19 are preferably spaced apart to provide a vortex chamber 20 between the vanes. The rectifying vanes 18 are preferably contoured and relatively closely spaced to rectify the flow of the fluid and transmit it to the vortex chamber 20, and the main vanes 19 in streamlines and with minimum turbulence.

The inner turbine shroud 17 is provided with an outer turbine shroud 21 which carries rectifying vanes 22 and main vanes 23 spaced apart to provide a free vortex chamber 24 therebetween. Axially movable turbine vanes 25 carried by a ring 26 are interposed between the inner and outer turbine shrouds 17 and 21 respectively. The inner face of the ring 26 is threaded to cooperate with external threads carried by the inner turbine shroud 17 whereby the turbine vanes 25 may be shifted axially into or substantially out of the fluid circuit. Suitable resilient means, such for example as the spring 27, may be provided to cooperate with the force exerted on the ends of the vanes by fluid reaction in the power transmitting fluid circuit to yieldingly urge the turbine vanes 25 into the fluid circuit under certain operating conditions.

If desired, the unit may be designed in such a manner that the turbine vanes 25 may be introduced into the fluid circuit when the device is operating as a turbo clutch to provide the two stage turbine. It will also be apparent that the unit may be designed in such a manner that the turbine vanes 25 may be introduced into the fluid circuit by fluid reaction exerted on the portions of the vanes extending into the fluid circuit when the device is operating as a torque converter to transmit high torque. When so operating the threads between the ring 26 and the shroud member 17 should be of the opposite hand than when the device is operated to have the vanes 25 positioned in the circuit when the device operates as a turbo clutch.

In the operation of this device energy is imparted to a fluid by means of the first and second stage impeller vanes 4 and 5. The energy transmitted to the fluid is absorbed by the first stage turbine vanes 25, the second stage turbine vanes 22 and 23 and third stage turbine vanes 18 and 19 and transmitted through the turbine web 16 and radially extending web 15 to the driven shaft 14.

Interposed between the second stage turbine vanes 22 and 23 and the third stage turbine vanes 18 and 19 is an axially shiftable guide wheel member 28 having suitable reaction vanes. The guide wheel 28 is preferably carried by an axially shiftable web member 29 suitably mounted on the stationary sleeve 13, and is shiftable between extreme positions wherein the reaction vanes are either in or substantially removed from the fluid circuit.

The guide wheel web 29 preferably terminates in a hub 30 having internal helical threads 31 which cooperate with external helical threads 32 carried by the stationary sleeve 13. The external threads 32 are of approximately the same axial length as the hub 30. The stationary sleeve 13 is provided with a smooth exterior portion 33 of slightly greater length than the hub 30 whereby the hub 30 may shift axially relative to the stationary sleeve 13 to disengage the external threads 32 and rotate freely on the portion 33 of the sleeve 13.

Suitable resilient means 34 carried by the hub 30 may be provided to engage a stationary flange 35 carried by the sleeve 13 to yieldingly urge the hub 30 into engagement with the external helical threads 32 under certain operating conditions. A block 36 carried by the hub 30 and resiliently urged into engagement with the stationary sleeve 13 by any suitable means such for example as a spring 37 may be provided, if desired, to assist the spring 34 in moving the hub 30 into engagement with the external helical threads 32 or to yieldingly urge the hub 30 longitudinally of the sleeve 13 towards the stationary flange 35, dependent on the direction of rotation between the hub 30 and the stationary sleeve 13. This longitudinal movement of the hub 30 is transmitted by the block 36 by reason of the fact that the block 36 is disposed at an angle to the sleeve 13 and to the hub 30 as more clearly illustrated in Fig. 2.

In the operation of this device when the load is initially applied to the device the guide wheel 28 may be positioned in the fluid circuit as illustrated whereupon the device will operate as a torque converter to transmit increased torque at lower speed. When the speed of operation of the impeller and turbine members approaches a substantially predetermined speed ratio, preferably accompanied by a slight decrease in the load transmitted, the fluid reaction exerted on the vanes of the guide wheel 28 will rotate the guide wheel 28 and the web 29 relative to the stationary sleeve 13. The helical threads 31 and 32 carried by the hub 30 and sleeve 13 will move the web 29 and guide wheel 28 axially substantially out of the fluid circuit thereby transforming the unit from a torque converter to operate as a turbo clutch to transmit power at a substantially 1:1 ratio with substantially no torque multiplication.

When the device thus operates as a turbo clutch the internal threads 31 of the hub 30 engage the surface 33 of the sleeve 13 to rotate freely thereon in the forward direction, the block 36 resiliently urging the hub 30 away from the threads 32 of the sleeve 13. The ends of the external threads 32 adjacent the stationary flange 35 and the internal ends of the helix 31 of the hub 30 may be tapered as illustrated in Fig. 2 to facilitate reengagement of the hub with the external thread 32 when the fluid reaction in the circuit tends to move the guide wheel in the opposite direction to transform the unit from a turbo clutch to a torque converter.

Referring to Fig. 4, it will be observed that suitable bearing means 38 and 39 carried by the sleeve 13 and hub 30 respectively may be employed to provide a substantially frictionless support for the hub 30 and guide wheel web 29. The bearing 38 may be of slightly larger diameter than the sleeve 13, and the bearing 39 may be of slightly smaller diameter than the hub 30 whereby the bearings may be subjected to load thereby preventing direct engagement between the hub and sleeve members.

The driven shaft 14 terminates in a radially extending flange 40 which cooperates with a radially extending clutch facing 41 carried by a final driven shaft 42 to transmit power from the driven shaft 14 to the final driven shaft. As illustrated, the final driven shaft 42 is concentrically mounted relative to the driven shaft 14 and is provided with spaced bearing means 43 and 44 to prevent buckling between the two shafts. The resilient bushings 12 eliminate the necessity of accurately aligning the component sections of the transmission device thereby facilitating the operations of manufacturing and assembling the unit.

If desired, alternative resilient means such for example as transverse leaf spring means 45 operably connected to the radially extending flange 11 at one end and connected to the bell housing 10 by suitable resilient means 46 at its opposite ends may be employed in lieu of the resilient means illustrated in Fig. 1. It will of course be obvious that other suitable types of resilient means may also be employed.

In the embodiment of the invention illustrated in Figs. 5 and 6 it will be observed that a driving shaft 50 is operably connected to an impeller housing 51 and that a driven shaft 52 is provided with a turbine 53. A stationary sleeve 54 having external helical threads 55 surrounds the driven shaft 52 and receives a hub 56 of a radially extending guide wheel web 57.

The web 57 carries a plurality of spaced guide wheel chambers 58, 59 and 60 which may be selectively shifted into alignment with the fluid circuit 61 formed by the impeller and turbine units. The guide wheel chambers 58, 59 and 60 may be provided with vanes 58A, 59A and 60A respectively of suitable configuration as illustrated in Fig. 5A so that the device may selectively function as a torque converter when the guide wheel chamber 58 is in alignment with the fluid circuit 61, or as a turbo clutch when the guide wheel chamber 59 is operative, or to transmit power at overdrive when the guide wheel chamber 60 is operative. When so designed the chamber 58 is provided with vanes having thick heavily curved sections; the chamber 59 has relatively thin slightly curved vanes, and the chamber 60 has medium thick moderately curved vanes. If desired, the vanes 58B, 59B and 60B in the guide wheel chambers 58, 59 and 60 may be designed as illustrated in Fig. 5B in such a manner that the device will operate as a heavy torque converter when the guide wheel 58 is in the circuit, or as a relatively light torque converter when the guide wheel 59 is in the circuit, or a turbo clutch when the guide wheel 60 is in the circuit. When so designed, the chamber 58 has thick heavily curved vanes; the chamber 59 has vanes of medium thickness moderately curved sections, and the chamber 60 has relatively thin slightly curved vanes.

The operation will be substantially the same with either of the vane structures illustrated in Fig. 5A or 5B. The vanes 58A or 58B are positioned in the power transmitting fluid circuit when the fluid reaction therein is the greatest, whereupon the spring 65 is substantially fully compressed. When the reaction in the power transmitting fluid circuit decreases due to a decrease in the torque transmitted, the fluid impinging on the vanes 58A or 58B varies as to direction and reaction decreases whereupon the force of the spring 65 augmenting the force exerted by fluid reaction on the vanes 58A or 58B moves the web 57 axially on the helix 55 interposed between the hub 56 and sleeve 54. The web 57 rotates on the stationary sleeve 54 and moves axially to such an extent as to position the chamber 59 in the power transmitting fluid circuit. The vanes 59A or 59B then remain in the power transmitting fluid circuit until the fluid reaction within the circuit varies to such an extent that the forces exerted on the vanes in the circuit cause the vanes to be deflected angularly to such an extent as to vary the resultant force exerted thereon. This force coupled with the axial force exerted by the spring 65 on the hub 56 moves the web 57 axially to introduce the vanes 60A or 60B of the chamber 60 into the power transmitting fluid circuit to operate the device in the manner indicated above.

The guide wheel hub 56 cooperates with the sleeve 54 through the helical threads interposed therebetween to transmit the guide wheel reaction to the sleeve 54. The sleeve 54 is provided with oppositely directed arms 62 operatively connected by means of springs 63 to a frame 64. A spring 65 associated with the hub 56 and the sleeve 54 may be employed to influence the position to the hub 56 dependent on the reaction exerted on the guide wheel.

Referring now to the embodiment of the invention illustrated in Fig. 7, it will be observed that a driving shaft 70 is provided with an impeller housing 71 terminating in an axially extending portion 72 mounted on a stationary sleeve 73 which surrounds a driven shaft 74. The impeller housing 71 is provided with an impeller channel 75. The axial portion 72 supports an axially movable web member 76 having rectifying and auxiliary impeller blades 77 and 78. The rectifying vanes 77 are preferably proportioned in such a manner that when they are positioned in the fluid circuit, the device will operate as a torque converter whereas the vanes 78 are so proportioned as to operate the device as a turbo clutch when they are positioned in the fluid circuit. The fluid reaction in the fluid circuit will automatically shift web member 76 relative to the axial portion 72 of the impeller housing 71 to position either the blade 77 or 78 in the circuit depending on the speed and load being transmitted by the device.

The driven shaft 74 is provided with a turbine web 79 having a turbine channel 80 provided with suitable turbine vanes. Interposed between the impeller channel 75 and the turbine channel 80 is an axially shiftable turbine member having rectifying and auxiliary vanes 81 and 82. The helix between the web member 83 and sleeve 84 is selected so that when the fluid is impinging on the faces of the auxiliary vanes 81, the web member 83 will rotate on the helix to the position illustrated in Fig. 7 wherein the vanes 81 are positioned in the power transmitting fluid circuit. At light loads when the direction of power transmitting fluid varies to impinge on the back of the auxiliary vanes 81, the helix will withdraw the vanes 81 from the power transmitting fluid circuit and position the auxiliary vanes 82 therein. The unit is designed in such a way that the rectifying vanes 81 will be positioned in the fluid channel when the device is operating as a torque converter and the vanes 82 will be positioned in the fluid channel when the device is operating as a turbo clutch. The vanes 81 and 82 are preferably carried by a radially extending web member 83 suitably mounted on an axially extending sleeve portion 84 carried by the turbine web 79. Yielding means such for example as oppositely directed springs may be provided to yieldingly urge the web member 83 towards a substantially predetermined position to selectively interpose the vanes 81 or 82 in the fluid circuit in accordance with variations of fluid reaction in the power transmitting fluid circuit.

Interposed between the turbine channel 80 and the rectifying and auxiliary impeller blades 77 and 78 is a reaction member 85 having suitable vanes to operate the device as a torque converter, and a reaction member 86 having suitable vanes to operate the device as a turbo clutch. The reaction members 85 and 86 may be carried by the radially extending web member 87 terminating in a hub portion 88 having suitable helical threads 89 to cooperate with external helical threads 90 carried by the stationary sleeve 73. The hub 88 may shift axially relative to the sleeve 73 in the manner discussed heretofore to position either the reaction member 85 or the reaction member 86 in the fluid circuit depending on the fluid reaction to which the reaction member is subjected, the direction and angular relation of the helix and the relative strength of the springs employed to exert actuating forces on the movable members.

The embodiment illustrated in Fig. 8 is similar in many respects to that illustrated in Fig. 7. Corresponding parts have therefore been given corresponding reference numbers with the addition of one hundred. Auxiliary turbine rectifying vanes 191 and 192 cooperate with the rectifying vanes 181 and 182. The auxiliary guide wheel vanes 193 and 194 may be associated with the rectifying vanes 185 and 186.

When the device is operating as a torque converter to transmit power at high torque multiplication the guide wheel vanes 185 and 193 will be positioned in the fluid channel and the turbine vanes 181 and 191 will also be positioned in the fluid channel as illustrated. When the load to which the device is subjected is decreased and the torque multiplication is accordingly decreased, the guide wheel 194 will be introduced into the fluid circuit and the turbine vanes 182 will be introduced into the circuit. When the device is operating as a turbo clutch the guide wheel channels 186 and 194 will be introduced into the circuit and the turbine vanes 182 and 192 will be introduced into the channel.

Fig. 9 illustrates a feature of the invention adapted for use in any of the embodiments of the invention such for example as that of Fig. 1, wherein an axially shiftable member 100 mounted on a sleeve 101 may be shifted axially relative to a fluid circuit by means of the fluid reaction exerted against an angularly inclined vane 102. A helix 103 may be interposed between the axially shiftable member 100 and the sleeve 101 to shift the member 100 axially under the influence of fluid torque reaction. The axial movement of the shiftable member 100 on the helical thread between the member and the sleeve is facilitated by the side thrust exerted by the fluid against the angularly disposed vanes 102. In designs heretofore proposed, reaction or guide vane members have been axially extending. By positioning these vanes at an angle to the axis of the device, I take advantage of axial thrust developed by angular impingement of the fluid on one side of the angular members to assist in moving the guide wheel or reaction member axially relative to the power transmitting fluid circuit.

It is to be understood that various features disclosed in different views of this application may be substituted for corresponding portions of other views without departing from the spirit of my invention.

This application is a continuation-in-part of my co-pending application Serial No. 588,163, filed January 22, 1932, now Patent No. 2,222,618, issued November 26, 1940.

Features disclosed but not claimed herein are being claimed in my co-pending application Serial No. 500,309, filed August 28, 1943.

I claim:

1. A turbo transmission comprising driving and driven shafts, an impeller operably connected to the driving shaft, a turbine operably connected to the driven shaft, the impeller and turbine cooperating to form a fluid circuit, a stationary member, a guide wheel associated with the fluid circuit and movable on the stationary member into and out of the fluid circuit to selectively operate the transmission as a torque converter or as a turbo clutch, means including cooperating helical threads carried by a guide wheel hub and said stationary member whereby the guide wheel may be locked against rotation in the fluid circuit when the device is operating as a torque converter and may be substantially withdrawn from the fluid circuit and released to rotate when the device is operating as a turbo clutch, and yielding means associated with the hub and stationary member to yieldingly urge the guide wheel in one direction or the other relative to the stationary member dependent on the direction of rotation of the guide wheel hub.

2. A turbo transmission comprising a driving shaft, an impeller wheel having a plurality of spaced fluid energizing members operably connected to the driving shaft, a driven shaft, a turbine wheel having a plurality of spaced energy absorbing members operably connected to the driven shaft, the impeller and turbine wheels cooperating to form a fluid circuit, a guide wheel interposed between two of the energy absorbing members of the turbine wheel, a stationary member having a helically threaded portion, means associated with the guide wheel and stationary member comprising a guide wheel hub having internal helical threads cooperating with a helically threaded portion of the stationary member to restrain the guide wheel from rotation in the fluid circuit to operate the device as a torque converter or to withdraw the guide wheel from the fluid circuit to operate the device as a turbo clutch, and means including an angularly disposed block interposed between the guide wheel and stationary member to yieldingly urge the guide wheel axially relative to the stationary member dependent on the direction of rotation of the guide wheel member.

3. A turbo transmission comprising driving and driven shafts, an impeller having a plurality of spaced fluid energizing members operably connected to the driving shaft, a driven shaft, a turbine wheel including a plurality of energy absorbing members operably connected to the driven shaft, the impeller and turbine members cooperating to form a fluid circuit, means associated with the turbine wheel whereby an auxiliary energy absorbing member may be introduced into the fluid circuit between a pair of spaced fluid energizing members of the impeller, and yielding means urging said auxiliary energy absorbing member into the fluid circuit against the fluid reaction exerted in said circuit urging said member out of the circuit.

4. A turbine assembly for a turbo transmission comprising a driven shaft, a turbine web operably connected to the driven shaft, a turbine shroud member, connecting means between the web and shroud members comprising spaced rectifying and auxiliary turbine vanes, an auxiliary energy absorbing member operably connected to the shroud member, and cooperating means between said auxiliary member and shroud member whereby said auxiliary member may be partially drawn into or projected from the shroud member.

5. In a turbo transmission, a driven shaft, an axially extending stationary member concentrically mounted relative to the driven shaft, a fluid circuit, a guide wheel mounted on the stationary member and movable axially thereon into or out of the fluid circuit to operate the transmission as a torque converter or as a turbo clutch, cooperating means comprising an internally threaded guide wheel hub and a threaded segment on the stationary member whereby the guide wheel may be locked against rotation in the fluid circuit or shifted axially on the stationary member to withdraw the guide wheel from the fluid circuit to selectively operate the device as a torque converter or as a turbo clutch, and resilient means including an angularly disposed block resiliently urged into engagement with the stationary member to induce the guide wheel to shift axially on the stationary member away from or into engagement with the threaded portion of the stationary member, and yielding means associated with the guide wheel hub to urge the guide wheel toward the fluid circuit.

6. In a turbo transmission, spaced rotatable shafts, impeller and turbine wheels operably connected to said shafts and cooperating to form a power transmitting fluid circuit, a stationary member, an axially movable member associated with the stationary member, and blades carried by the axially shiftable member at an angle to the shaft whereby fluid circulating in the circuit may impart an axial force on the blades to shift said member axially relative to the stationary member.

7. A turbo transmission comprising driving and driven shafts, an impeller operably connected to the driving shaft, a turbine operably connected to the driven shaft, the impeller and turbine members cooperating to form a fluid circuit, a stationary member, guide wheel means associated with the fluid circuit and movable on the stationary member into and substantially out of the fluid circuit to selectively operate the transmission as a torque converter to transmit power with torque multiplication or as a turbo clutch to transmit power without torque multiplication, means including cooperating helical threads carried by guide wheel hub and said stationary member whereby the guide wheel may be locked against rotation in the fluid circuit when the device is operating as a torque converter and may be withdrawn from the fluid circuit when the device is operating as a turbo clutch, and means associated with the hub and stationary member comprising an angularly disposed block to yieldingly urge the guide wheel in one direction or the other relative to the stationary member dependent on the direction of rotation of the guide wheel hub.

8. A turbo transmission comprising a driving shaft, spaced impeller vanes carried by the driving shaft, a driven shaft, a turbine carried by the driven shaft and having a turbine shroud, auxiliary turbine vanes carried by the turbine shroud, and cooperating means between the turbine shroud and the auxiliary turbine vanes whereby the auxiliary turbine vanes may be introduced between the spaced impeller vanes.

9. A turbo transmission comprising driving and driven shafts, multi-stage impeller and turbine members carried by the driving and driven shafts and cooperating to form a power transmitting fluid circuit, and auxiliary turbine vanes adapted to be interposed in the power transmitting fluid circuit between spaced stages of the impeller vanes under the influence of fluid reaction developed in the power transmitting fluid circuit.

10. A fluid power transmission comprising a driving shaft having spaced impeller passages, a driven shaft having a turbine member including a shroud member, and spaced turbine passages cooperating with the impeller passages to form a power transmitting fluid circuit, an auxiliary turbine member carried by the turbine shroud and adapted to be projected from the shroud into the power transmitting fluid circuit between spaced impeller passages automatically under the influence of fluid reaction developed in the power transmitting fluid circuit, and yielding means urging the auxiliary turbine member into the power transmitting fluid circuit.

11. A fluid transmission comprising an impeller, a turbine associated therewith and providing in conjunction with the impeller a fluid circuit, a reaction member movable axially into and substantially out of the fluid circuit, and axially inclined vanes on the reaction member to create an axial thrust to move the reaction member relative to the fluid circuit.

12. A fluid transmission comprising an impeller, a turbine providing in conjunction therewith a fluid circuit, a reaction member movable into and out of the fluid circuit, axially inclined reaction vanes on the reaction member to impart an axial thrust to the reaction member, a screw supporting the reaction member for axial movement, and means carried by the reaction member tending to urge the reaction member into engagement with the screw.

13. A fluid transmission comprising an impeller, a turbine providing in conjunction with the impeller a fluid circuit, a stationary member, a threaded segment on the stationary member, a reaction member mounted for axial travel on the threaded segment and stationary member, vanes on the reaction member movable into and out of the fluid circuit, said vanes being inclined axially to exert an axial force on the reaction member under the influence of the fluid in the fluid circuit, a spring pressed member carried by the reaction member and adapted to engage the periphery of the stationary member and exert thereon an axial force to direct the reaction member into engagement with the screw.

JOSEPH JANDASEK.